No. 773,380. PATENTED OCT. 25, 1904.
G. M. EULER.
DOUGH KNEADING MACHINE.
APPLICATION FILED JAN. 9, 1904.
NO MODEL. 3 SHEETS—SHEET 1.
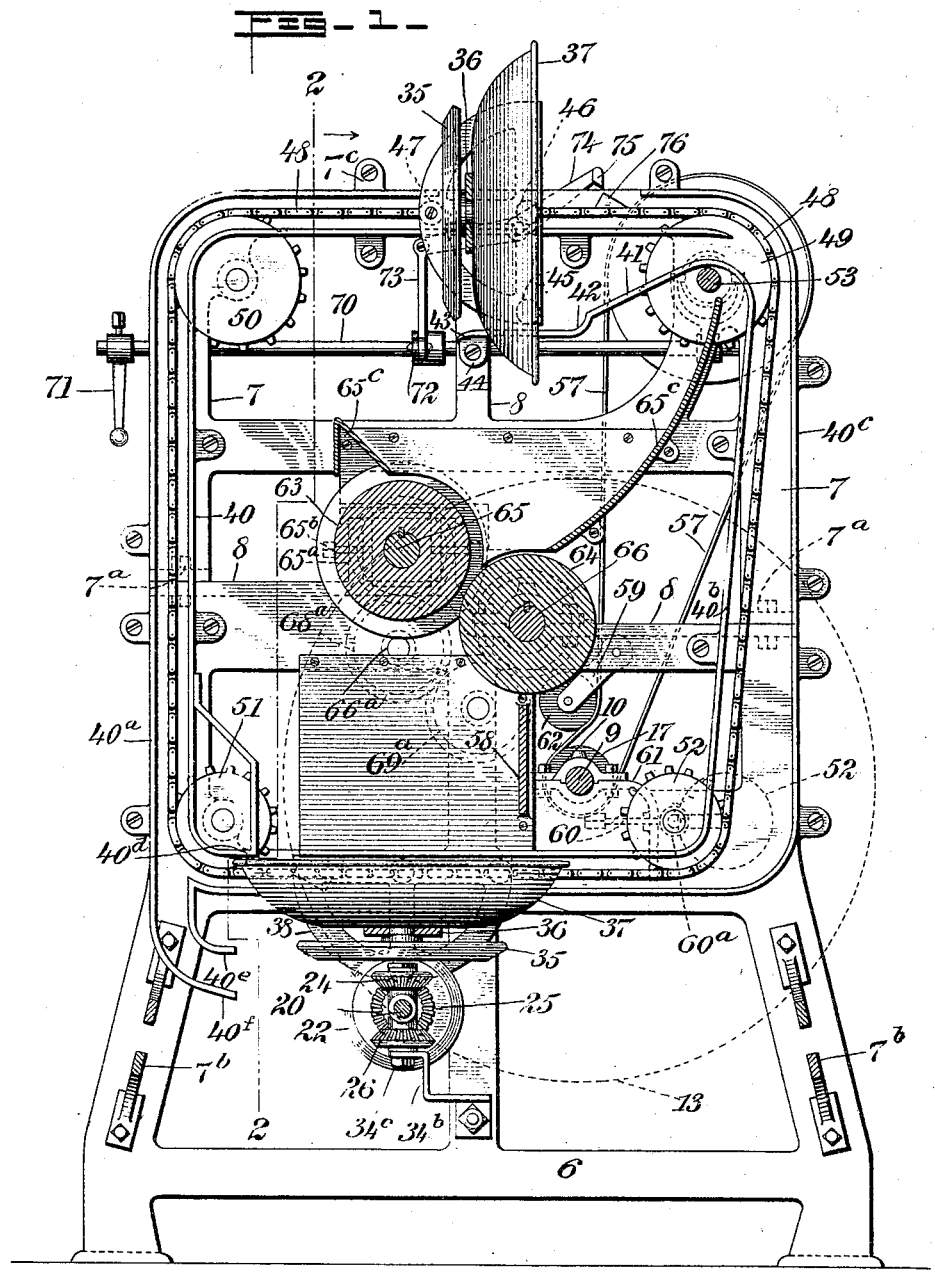
WITNESSES:
A. C. Abbott
W. Harrison
INVENTOR
George M. Euler
BY
ATTORNEYS

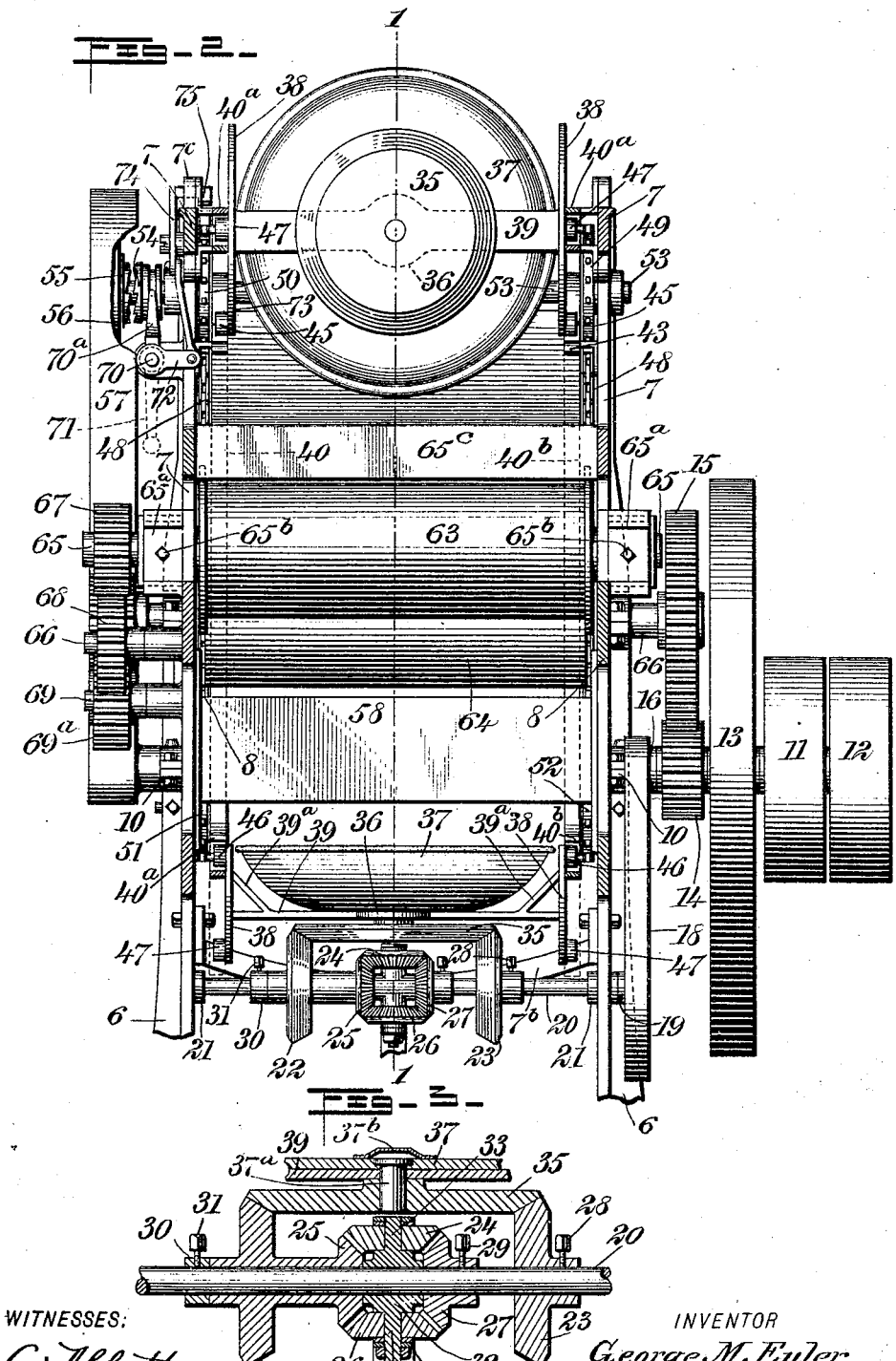

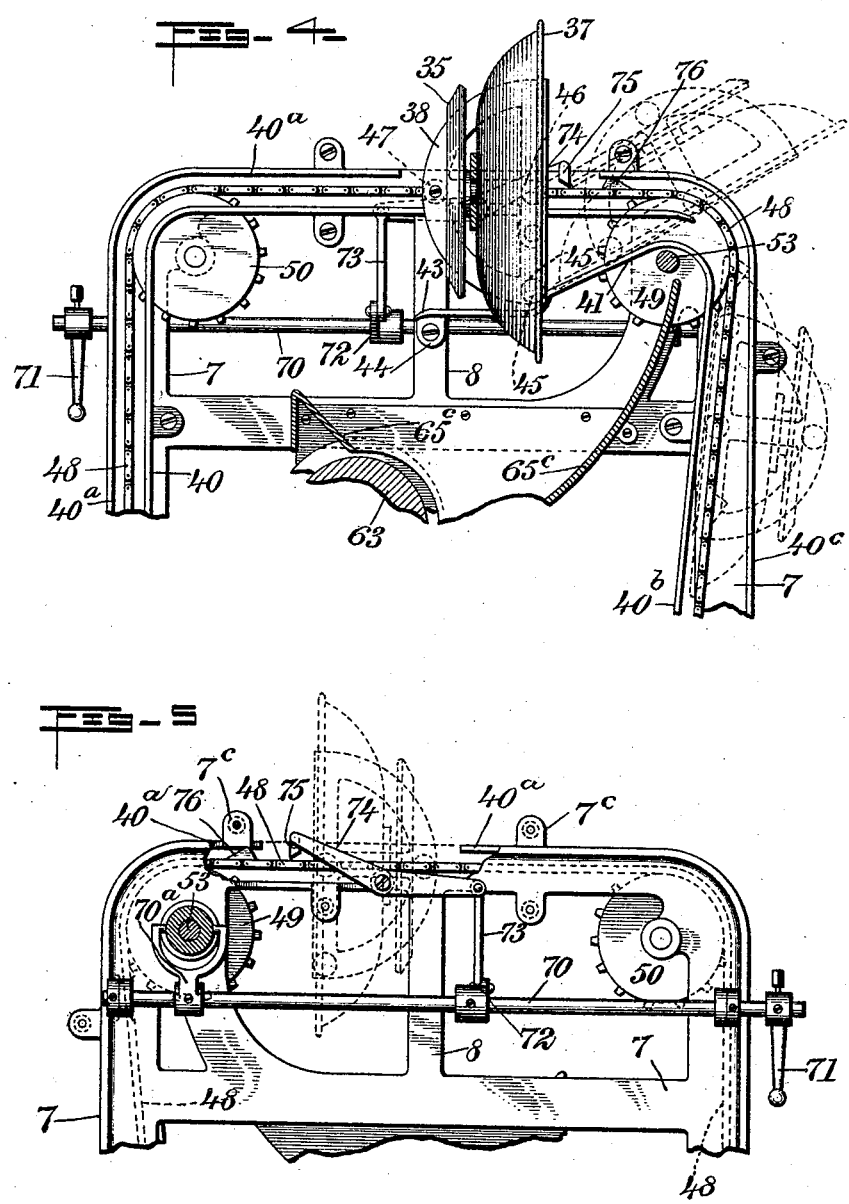

No. 773,380. Patented October 25, 1904.

UNITED STATES PATENT OFFICE.

GEORGE MICHAEL EULER, OF ST. LOUIS, MISSOURI.

DOUGH-KNEADING MACHINE.

SPECIFICATION forming part of Letters Patent No. 773,380, dated October 25, 1904.

Application filed January 9, 1904. Serial No. 188,276. (No model.)

*To all whom it may concern:*

Be it known that I, GEORGE MICHAEL EULER, a citizen of the United States, and a resident of St. Louis, in the State of Missouri, have invented a new and Improved Dough-Kneading Machine, of which the following is a full, clear, and exact description.

My invention relates to dough-kneading machines and analogous devices in which it is desirable to knead or work a plastic substance, such as dough, and in which it is desirable to shift the same from one pan to another with a minimum expenditure of labor.

Reference is to be had to the accompanying drawings, forming a part of this specification, in which similar characters of reference indicate corresponding parts in all the figures.

Figure 1 is a vertical section through a machine embodying my invention and taken in the plane of the line 1 1 in Fig. 2. Fig. 2 is a vertical section taken at right angles to the view shown in Fig. 1 and upon the line 2 2 in Fig. 1 looking in the direction of the arrow. Fig. 3 is a fragmentary vertical section through the gearing for rotating the pans. Fig. 4 is a fragmentary section somewhat similar to the upper portion of Fig. 1 and showing in dotted and full lines certain movements of the pans; and Fig. 5 is a side elevation, partly broken away, viewed from the reverse side of Fig. 4.

The frame members 6 7 are bolted together at $7^a$, so as to constitute the general framework of the machine. Braces $7^b$ and 8 are employed for the purpose of rendering the framework rigid and strong. A revoluble shaft 9 is mounted within bearings 10 and is provided with loose and fixed pulleys 11 12, with a fly-wheel 13, and with a spur-gear 14, these parts being of ordinary construction. The spur-gear 14 meshes with a larger spur-gear 15 for the purpose of communicating power to certain movable parts, as hereinafter described. Mounted rigidly upon the shaft 9 is a pulley 16, which communicates motion to another pulley 19 by means of a belt 18. The pulley 19 is rigidly mounted upon a revoluble shaft 20, which is supported within bearings 21. Mounted upon this shaft is a loose friction-gear member 22, integrally connected with a smaller bevel-gear 25. Rigidly mounted upon the shaft 20 is another friction-gear member 23, secured to the shaft by means of a bolt 28. The bevel-gear 25 meshes with similar bevel-gears 24 and 26, both of which latter gears mesh with a small bevel-gear 27, the bevel-gears 24 and 26 being mounted on stems 33 34, in turn rigidly mounted upon a stationary head 32, which encircles the shaft 20. The small gear 27 is secured rigidly to the shaft 20 by means of the set-screw 29. A collar 30 is likewise secured rigidly to the shaft 20 by means of a set-screw 31. By means of lock-nuts $34^a$ or equivalent fastening members the bevel-gears 24 and 26 are prevented from leaving the stems 33 or 34, as indicated in Fig. 3. A friction bevel gear-wheel 35 is free to engage the friction-gear members 22 and 23, so as to be rotated at intervals thereby.

The pans are shown at 37, and each pan is connected with the bevel gear-wheel 35 and with a stem $37^a$, as indicated in Fig. 3, so that the rotation of either gear-wheel 35 causes the corresponding rotation of one of the pans 37. Mounted upon each side of each pan 37 is a sector 38, these sectors being arranged in pairs, as indicated in Fig. 2, and connected by a bridge member 39, having braces $39^a$. Each bridge member 39 is provided with an enlargement 36, through which the stem $37^a$ of the pan passes, as indicated in Fig. 3, the stem being covered by a shield $37^b$.

The head 32 is stationary and is mounted loosely on the shaft 20 and is prevented from turning by connecting either stem 33 or 34 by means of a rod, chain, or other suitable device with the frame of the machine. As here shown, (see Fig. 1,) the stem 34 is connected to the frame of the machine by a bracket $34^b$ and a nut $34^c$.

The frame-work is provided with suitable guides 40, $40^a$, $40^b$, and $40^c$, of the shape indicated more particularly in Fig. 1. The guide $40^b$ is provided with an inclined portion 41 and with a curved portion 42, the curved portion serving as a trip for shifting the relative angular position of each pan. The lower end of the guide 40 is provided with a loop $40^d$. The guide $40^c$ terminates at its lower end in a crook 40ᵉ, and the guide 40ᵃ is provided with a portion 40ᶠ opposite this crook. The portion 41 of the guide 40ᵇ adjacent to the curved portion 42 terminates in a rounded lip 43, secured at 44 to the brace 8, as indicated in Fig. 1. Each sector 38 is provided with rollers 45, 46, 47, the rollers 46 being pivotally connected with chains 48 and movable therewith. The rollers 45 and 47 are disconnected from this chain and are free to assume various positions in relation thereto, as indicated by dotted lines in Fig. 4. The chains 48 engage four sprocket-wheels 49, 50, 51, and 52, disposed in the positions indicated more particularly in Fig. 1. The sprocket-wheel 49 is rigidly mounted upon a shaft 53, this shaft being provided with clutch members 54 55, the clutch member 55 being connected with a pulley 56, this pulley receiving its power by means of a belt 57 from the power-pulley 17, mounted upon the shaft 9, as indicated in Fig. 1, the shaft 9 in turn receiving its power from the power-pulleys 11 12, as above described. The clutch members are thrown into and out of engagement by a fork 70ᵃ. A gate 58, preferably removable, is used, as indicated in Figs. 1 and 2, for allowing access to the pan 37 when in its lowermost position. An idler 62, mounted upon a swinging arm 59, engages the belt 57 for the purpose of keeping the same taut. An adjustment-screw 60 passes through a rib 61 upon the framework and engages the movable bearing 60ᵃ, thereby enabling the sprocket-wheel 52 to be shifted laterally, as indicated by dotted lines in Fig. 1, so as to regulate the tension of the sprocket-chain 48.

The upper kneading-roll is shown at 63 and the lower one at 64, these rolls being respectively mounted upon revoluble shafts 65 66, substantially in the usual manner. By means of slidable bearings 65ᵃ, controlled by adjustment-screws 65ᵇ, the roll 63 may be adjusted with reference to the roll 64 without interfering with the proper functions of either roll. A hopper 65ᶜ is used for guiding the dough between the rolls 63 and 64. The shafts 65 66 are provided, respectively, with gear-wheels 67 68, meshing with somewhat similar gears 68ᵃ and 69ᵃ on shafts 66ᵃ and 69. Power is communicated by means of the fixed pulley 11 to the shaft 9 and fly-wheel 13. By means of the gears 14 and 15 power is transferred from the shaft 66 to the roll 64 and thence across the machine from the shaft 66 to the gearing shown at the left in Fig. 2 and thence to the roll 63 by means of the shaft 65. The power is thus indirectly transferred from the roll 64 to the roll 63 in order to prevent interfering with the adjustment of the roll 63 relatively to the roll 64, as above described.

A rocking shaft 70 is provided with a handle 71 and with a radially-disposed arm 72, and said arm is connected by means of a link 73 with a lever 74, having upon its outer end a beveled lug 75, which may be engaged by a traveling wedge 76, mounted upon the chain 48.

My invention is used as follows: Assume that the dough is lying in the lower pan 37 and the operator desires to run the dough between the rolls. He grasps the handle 71 and turns the rocking shaft 70 through a slight angle, thereby raising the radially-disposed arm 72 and the link 73, and thus lowering the upper or free end of the lever 74 and the beveled lug 75, so that the latter will lie in the path of the traveling wedge 76. This movement of the rocking shaft 70 of course causes an angular movement of the fork 70ᵃ, and thereby shifts the clutch member 54 into engagement with the clutch member 55. As the belt 57 is giving motion to the pulley 56 it follows that the clutch engages as above described and power is given to the shaft 53, and consequently to the sprocket-wheel 49. This drives the sprocket-chain 48, and consequently shifts the positions of the pans 37. The lower pan 37 being of course suspended by means of the rollers 46 travels to the left, so that the roller 47 passes into the lower end of the guideway—that is, between the ends 40ᵉ and 40ᶠ—the rollers 45 and 46 remaining horizontal relatively to each other. This causes the pan to maintain its horizontal or normal position. (Indicated at the bottom of Figs. 1 and 2.) The movements of the chains 48 carry the pan vertically upward, the rollers 47 passing the corner 40ᵈ of the guide 40. Arriving at the top of the frame, where the chains 48 pass over the sprocket-wheels 50, the pan of course turns at a right angle, assuming the position shown in full lines at the top of Figs. 1, 2, and 4. Arriving in this position the dough is dropped from the upper pan 37 into the hopper 65ᶜ ready to be acted upon by the rolls 63 and 64. At this moment the traveling wedge 76 engages the lug 75 upon the lever 74, thereby raising the upper or free end of this lever, causing the link 73 and the arm 72 to descend, and thereby shift the angular position of the fork 70ᵃ, (see Fig. 2,) so as to move the clutch member 54, thereby disengaging the grip of the clutch. This throws the sprocket-wheels out of action and stops the bodily travel of the pans, which then assume the position indicated in Fig. 1. The rolls 63 64 continue to rotate, however, so that the dough is passed between them and gradually fed into the lower pan 37. This pan while no longer traveling under the movements of the chains has, nevertheless, a movement of a different character conferred upon it by the rotation of the friction gear-wheel 35. The belt 18 receives power continuously from the shaft 9 and causes the shaft 20 to rotate constantly. The bevel-gears 23 and 27 being fixed upon the shaft 20 must also rotate constantly. The bevel-gear 27 drives the bevel-gears 24, 25, and 26, as above described, thereby giving motion to the friction-gear 22, so that the wheels 22 and 23 always rotate in opposite directions. If now the friction-wheel 35 engages these wheels 22 and 23 or either of them, motion is communicated to the wheel 35 and through it to the lower pan 37. While normally the friction-wheel 35 will engage both wheels 22 and 23, it may sometimes happen through lack of adjustment that the wheel 35 touches but one, and in this event the rotation of the pan is not interfered with in the least. If the operator desires to repeat the operation, he merely turns the handle 71, as above described, causing the clutch members 54 and 55 to engage. This starts up the chains 48 and causes the pans to exchange places, as above described. The machine stops automatically upon arriving at the position indicated in Fig. 1.

The object contemplated in rotating the lower pan of the machine is to change the position of the dough relatively to the kneading-rolls after the dough has passed between said rolls.

The position of the mechanism when started by the operator is shown in Fig. 4, the traveling wedge 76 having passed the lug 75 and the upper free end of the lever 74 being depressed because of the operator's control of the handle 71. In practical operation it is usually necessary to run the dough between the rolls eight or ten times before the kneading is complete. If the rolls 63 or 64 need adjustment relatively to each other, this is accomplished by the screws 65$^b$, as above described. In order to loosen or tighten the sprocket-chains, the sprocket-wheels 52 are moved in a horizontal direction by means of the adjusting-screws 60.

Having thus described my invention, I claim as new and desire to secure by Letters Patent—

1. In a dough-kneading machine, the combination of mechanism for working the dough, a plurality of pans movable relatively to said mechanism, means for shifting said pans in predetermined positions relatively to said mechanism, and gearing for causing said pans to rotate.

2. In a dough-kneading machine, the combination of a frame, a plurality of revoluble rolls mounted therein, sprocket-wheels mounted upon said frame, sprocket-chains engaging said sprocket-wheels, mechanism connected with said sprocket-chains for supporting pans, means for intermittingly actuating said mechanism so as to cause said pans to assume definite predetermined positions relatively to said rolls, and mechanism for automatically causing said pans to rotate.

3. In a dough-kneading machine, the combination of dough-working mechanism, longitudinal flexible members disposed adjacent to the same and free to move, pans connected with said longitudinal flexible members, means for causing said pans to perform complete revolutions, clutch mechanism for throwing said longitudinal flexible members into and out of action, and mechanism controllable by movements of said longitudinal flexible members for automatically throwing said clutch mechanism out of action so as to stop said pans in certain predetermined general positions.

4. In a dough-kneading machine, the combination of a frame, revoluble rolls mounted therein, pans supported by said frame and movable relatively to said rolls, means for moving said pans bodily into different predetermined positions relatively to said rolls, revoluble members rigidly connected with said pans, and automatic mechanism for intermittently actuating said revoluble members for the purpose of causing said pans to rotate.

5. In a dough-kneading machine, the combination of a frame, revoluble sprocket-wheels connected therewith, longitudinal flexible members engaging said revoluble members, pans connected with said longitudinal flexible members, mechanism disposed adjacent to said pans for the purpose of working dough and depositing the same therein, and mechanism connected with said revoluble members for adjusting the tension of the longitudinal flexible members.

6. In a dough-kneading machine, the combination of a frame provided with guides, rollers for engaging said guides, sprocket-chains for supporting said rollers independently of said guides, supporting members mounted upon said rollers, pans rotatably mounted upon said supporting members, means for actuating said sprocket-chains so as to shift said pans into different general positions, and means for working dough and feeding the same to and from said pans in said different general positions.

7. In a dough-kneading machine, the combination of mechanism for working the dough, guides extending over and under said working mechanism, rollers engaging said guides, carriers supported by said rollers and adapted to perform complete revolutions, endless, flexible connecting members between said carriers, and mechanism for imparting longitudinal movement to said connecting members, said guides and rollers coacting during the travel of said carriers to change the position of said carriers in relation to the connecting members.

8. In a dough-kneading machine, the combination of mechanism for working the dough, a plurality of receptacles adapted to trip relatively to said mechanism and adapted to make complete revolutions, means for shifting said receptacles from a position to feed dough to the working mechanism to a position to receive dough from said working mechanism, and mechanism for suddenly tilting said receptacles.

9. In a dough-kneading machine, the combination of rolls for working the dough, a pan to be disposed adjacent to said rolls and adapted to make complete revolutions, and automatic mechanism for causing said pan to tilt suddenly when it reaches a predetermined point relatively to said rolls.

In testimony whereof I have signed my name to this specification in the presence of two subscribing witnesses.

GEORGE MICHAEL EULER.

Witnesses:
W. B. JAMES,
JOHN H. BATZ, Jr.